United States Patent
Braunberger

(10) Patent No.: US 10,318,604 B2
(45) Date of Patent: Jun. 11, 2019

(54) ELECTRONICALLY READABLE SYSTEM AND DEVICE WITH CHANGING CODES

(71) Applicant: Vision Works IP Corporation, Sequim, WA (US)

(72) Inventor: Fritz Braunberger, Sequim, WA (US)

(73) Assignee: Vision Works IP Corporation, Sequim, WA (US)

( * ) Notice: Subject to any disclaimer, the term of this patent is extended or adjusted under 35 U.S.C. 154(b) by 0 days.

(21) Appl. No.: 15/431,420

(22) Filed: Feb. 13, 2017

(65) Prior Publication Data

US 2018/0232455 A1 Aug. 16, 2018

(51) Int. Cl.
- *G06F 16/955* (2019.01)
- *G06K 7/14* (2006.01)
- *G06K 19/06* (2006.01)
- *G06K 19/073* (2006.01)

(52) U.S. Cl.
CPC ......... *G06F 16/955* (2019.01); *G06K 7/1417* (2013.01); *G06K 19/06037* (2013.01); *G06K 19/073* (2013.01)

(58) Field of Classification Search
CPC ............ G06F 17/30876; G06K 7/1417; G06K 19/06037
USPC ........................................ 235/375, 487, 492
See application file for complete search history.

(56) References Cited

U.S. PATENT DOCUMENTS

| | | | |
|---|---|---|---|
| 2,651,755 A | 9/1953 | Triplett | |
| 3,119,754 A | 1/1964 | Blumenfeld et al. | |
| 3,138,686 A | 6/1964 | Mitoff | |
| 3,210,662 A | 10/1965 | Steinmetz et al. | |
| 3,336,212 A | 8/1967 | Nicholas | |
| 3,512,049 A | 5/1970 | Hoberman | |
| 3,543,582 A | 12/1970 | Sessler | |
| 3,564,347 A | 2/1971 | Peck | |
| 3,613,002 A | 10/1971 | Trenkler et al. | |
| 3,638,120 A | 1/1972 | Jost | |
| 3,768,015 A | 10/1973 | Moser | |
| 3,849,657 A | 11/1974 | Hamblen | |
| 3,942,467 A | 3/1976 | Witonsky | |
| 3,967,579 A | 7/1976 | Seiter | |
| 3,974,495 A | 8/1976 | Jones | |

(Continued)

FOREIGN PATENT DOCUMENTS

| WO | 2001/82006 A1 | 11/2001 |
|---|---|---|
| WO | 2003/052524 A2 | 6/2003 |

(Continued)

OTHER PUBLICATIONS

The International Search Report and Written Opinion from the International Application No. PCT/US18/17861.

*Primary Examiner* — Paultep Savusdiphol
(74) *Attorney, Agent, or Firm* — Haverstock & Owens LLP

(57) ABSTRACT

An electronically readable device and system is incorporated within and/or attached to an object to validate and/or authenticate the object. Upon activation of the device one or more codes encoded within the device are revealed and are able to be scanned by an electronic device. The electronically readable code changes, such that for each period of time the code is different than a previous period and only the database knows in advance what the code should be for a given period. The scanned code is uploaded to the database where it is compared to a stored code to verify that the object is authentic.

8 Claims, 2 Drawing Sheets

(56) References Cited

U.S. PATENT DOCUMENTS

| | | |
|---|---|---|
| 3,977,900 A | 8/1976 | Luehrs |
| 3,999,946 A | 12/1976 | Patel et al. |
| 4,044,707 A | 8/1977 | Byrne |
| 4,084,511 A | 4/1978 | Svrjcek |
| 4,100,490 A | 7/1978 | Peck |
| 4,153,345 A | 5/1979 | Duchene et al. |
| 4,212,153 A | 7/1980 | Kydonieus et al. |
| 4,277,974 A | 7/1981 | Karr et al. |
| 4,308,486 A | 12/1981 | Gange |
| 4,314,874 A | 2/1982 | Abe et al. |
| 4,327,117 A | 4/1982 | Lenack et al. |
| 4,392,236 A | 7/1983 | Sandstorm et al. |
| 4,408,557 A | 10/1983 | Bradley |
| 4,431,313 A | 2/1984 | Hemperly |
| 4,436,435 A | 3/1984 | Ushikoshi |
| 4,488,780 A | 12/1984 | Nicholson |
| 4,505,538 A | 3/1985 | Toussaint |
| 4,505,595 A | 3/1985 | Rose et al. |
| 4,527,522 A | 7/1985 | Cerny |
| 4,629,330 A | 12/1986 | Nichols |
| 4,646,066 A | 2/1987 | Baughman |
| 4,797,864 A | 1/1989 | Stano et al. |
| 4,804,275 A | 2/1989 | Kang et al. |
| 4,844,622 A | 7/1989 | Weiss |
| 4,860,269 A | 8/1989 | Hennings et al. |
| 4,929,090 A | 5/1990 | Grahm |
| 5,034,233 A | 7/1991 | McCoy, Jr. |
| 5,045,283 A | 9/1991 | Patel |
| 5,053,339 A | 10/1991 | Patel |
| 5,085,802 A | 2/1992 | Jalinski |
| 5,182,212 A | 1/1993 | Jalinski |
| 5,254,473 A | 10/1993 | Patel |
| 5,317,987 A | 6/1994 | Muller |
| 5,339,024 A | 8/1994 | Kuo et al. |
| 5,368,905 A | 11/1994 | Ohno |
| 5,396,177 A * | 3/1995 | Kuo .................... H01M 6/5044 324/426 |
| 5,418,086 A | 5/1995 | Bailey |
| 5,420,000 A | 5/1995 | Patel et al. |
| 5,446,705 A | 8/1995 | Haas |
| 5,544,925 A | 8/1996 | Ikeda |
| 5,555,223 A | 9/1996 | Barainsky |
| 5,602,804 A | 2/1997 | Haas |
| 5,633,835 A | 5/1997 | Haas et al. |
| 5,667,303 A | 9/1997 | Arens et al. |
| 5,672,465 A | 9/1997 | Patel et al. |
| 5,673,028 A * | 9/1997 | Levy ...................... G01D 7/005 116/209 |
| 5,699,326 A | 12/1997 | Haas et al. |
| 5,709,472 A | 1/1998 | Prusik et al. |
| 5,719,828 A | 2/1998 | Haas et al. |
| 5,756,356 A | 5/1998 | Yangai et al. |
| 5,785,354 A | 7/1998 | Haas |
| 5,797,344 A | 8/1998 | Rothschild et al. |
| 5,802,015 A | 9/1998 | Rothschild et al. |
| 5,822,280 A | 10/1998 | Haas |
| 5,830,683 A | 11/1998 | Hendricks et al. |
| 5,862,101 A | 1/1999 | Haas |
| 5,912,759 A | 6/1999 | Good et al. |
| 5,930,023 A | 6/1999 | Mitchell, Jr. et al. |
| 5,930,206 A | 7/1999 | Haas et al. |
| 5,947,369 A | 9/1999 | Frommer et al. |
| 5,959,295 A | 9/1999 | Braun |
| 5,989,852 A | 11/1999 | Hendricks et al. |
| 5,997,927 A | 12/1999 | Gics |
| 6,042,264 A | 3/2000 | Prusik et al. |
| 6,103,351 A | 8/2000 | Ram et al. |
| 6,113,857 A | 9/2000 | Manico et al. |
| 6,198,701 B1 | 3/2001 | De Jonghe et al. |
| 6,243,192 B1 | 6/2001 | Mitchell, Jr. et al. |
| 6,244,208 B1 | 6/2001 | Qiu et al. |
| 6,254,969 B1 | 7/2001 | Eberle |
| 6,269,764 B1 | 8/2001 | Adamy et al. |
| 6,285,492 B1 | 9/2001 | Good et al. |
| 6,295,252 B1 | 9/2001 | Holt et al. |
| 6,331,076 B1 | 12/2001 | Coll |
| 6,335,692 B1 | 1/2002 | Compton |
| 6,373,786 B1 | 4/2002 | Kagan et al. |
| 6,426,503 B1 | 7/2002 | Wuest |
| 6,435,128 B2 | 8/2002 | Qiu et al. |
| 6,452,873 B1 | 9/2002 | Holt et al. |
| 6,544,925 B1 | 4/2003 | Prusik et al. |
| 6,750,458 B1 | 6/2004 | Rourk |
| 6,801,477 B2 | 10/2004 | Braunberger |
| 6,822,931 B2 | 11/2004 | Braunberger |
| 6,826,119 B2 | 11/2004 | Fortune |
| 6,968,804 B1 | 11/2005 | Barbieri |
| 6,974,249 B1 | 12/2005 | Fair |
| 7,079,452 B2 | 7/2006 | Harrison |
| 7,215,976 B2 | 5/2007 | Brideglall |
| 7,254,095 B1 | 8/2007 | Braunberger |
| 7,294,379 B2 | 11/2007 | Ko et al. |
| 7,362,663 B2 | 4/2008 | Kagan |
| 7,372,780 B1 | 5/2008 | Braunberger |
| 7,463,558 B2 | 12/2008 | Braunberger |
| 7,476,874 B2 | 1/2009 | Patel |
| 7,489,596 B2 | 2/2009 | Kuczynski |
| 7,589,331 B2 | 9/2009 | Havens |
| 8,018,347 B2 | 9/2011 | Tehrani et al. |
| 8,077,553 B2 | 12/2011 | Braunberger |
| 8,503,269 B2 | 8/2013 | Braunberger |
| 8,717,854 B2 | 5/2014 | Braunberger |
| 8,727,209 B1 * | 5/2014 | Shih ...................... G06Q 30/02 235/375 |
| 8,800,472 B2 | 8/2014 | Park |
| 9,188,962 B2 | 11/2015 | Braunberger |
| 2003/0053377 A1 | 3/2003 | Spevacek |
| 2003/0104353 A1 | 6/2003 | Brielmeier et al. |
| 2003/0104848 A1 | 6/2003 | Brideglall |
| 2003/0112711 A1 | 6/2003 | Braunberger |
| 2003/0151985 A1 | 8/2003 | Braunberger |
| 2003/0152483 A1 | 8/2003 | Munagavalasa et al. |
| 2004/0092023 A1 | 5/2004 | Wright |
| 2004/0232052 A1 | 11/2004 | Call et al. |
| 2005/0248455 A1 | 11/2005 | Pope et al. |
| 2005/0276165 A1 | 12/2005 | Chien |
| 2006/0145091 A1 | 7/2006 | Patel |
| 2006/0145863 A1 | 7/2006 | Martin et al. |
| 2006/0227669 A1 | 10/2006 | Pennaz et al. |
| 2006/0260534 A1 | 11/2006 | Petrakis |
| 2007/0064541 A1 | 3/2007 | Kagan |
| 2007/0089433 A1 | 4/2007 | McDonell et al. |
| 2007/0268785 A1 | 11/2007 | Braunberger |
| 2008/0013595 A1 | 1/2008 | Tehrani |
| 2008/0023362 A1 | 1/2008 | Genosar |
| 2008/0043804 A1 | 2/2008 | Goldsimth et al. |
| 2008/0210152 A1 | 9/2008 | Robinson et al. |
| 2009/0010304 A1 | 1/2009 | Skinner et al. |
| 2009/0016176 A1 | 1/2009 | Braunberger |
| 2009/0266291 A1 | 10/2009 | Braunberger |
| 2009/0303041 A1 | 12/2009 | Tehrani et al. |
| 2010/0149929 A1 | 6/2010 | Braunberger |
| 2010/0219351 A1 | 9/2010 | Roberts et al. |
| 2010/0251955 A1 | 10/2010 | Knoll |
| 2010/0275835 A1 | 11/2010 | Su et al. |
| 2011/0017123 A1 | 1/2011 | Maschietti et al. |
| 2011/0037541 A1 | 2/2011 | Johnson et al. |
| 2011/0084128 A1 | 4/2011 | Haarer et al. |
| 2011/0096388 A1 * | 4/2011 | Agrawal ................ G02F 1/1506 359/268 |
| 2011/0286314 A1 | 11/2011 | Braunberger |
| 2012/0256727 A1 | 10/2012 | Moore, Jr. |
| 2013/0107676 A1 * | 5/2013 | Braunberger .......... G04F 13/04 368/114 |
| 2016/0012310 A1 * | 1/2016 | Kozicki ............. G06K 9/00577 382/218 |

FOREIGN PATENT DOCUMENTS

| | | |
|---|---|---|
| WO | 2004/077172 A2 | 9/2004 |
| WO | 2009/038806 A1 | 3/2009 |

(56) References Cited

FOREIGN PATENT DOCUMENTS

WO 2010/0099340 A2 9/2010
WO 2011098830 A1 8/2011

\* cited by examiner ure that used to lay hidden become visible. The expansion of the transparent region reveals various colors, text and/or patterns which have been printed just behind the anode.

ELECTRONICALLY READABLE SYSTEM AND DEVICE WITH CHANGING CODES

FIELD OF THE INVENTION

The present invention relates to systems and devices for revealing an electronically readable code. More specifically, the present invention relates to electronically readable systems and devices for revealing an electronically readable code over time.

BACKGROUND OF THE INVENTION

Galvanic cells, or Voltaic cells derive electrical energy from chemical reactions taking place within the cell. They generally consist of two different metals and an electrolyte. When the dissimilar metals come in contact with a common electrolyte, a potential difference is created between the metals. Once an electron path is provided, external to the cell itself, electrons flow from the anode to the cathode. Electrons flow from the anode to the cathode, depleting atoms of electrons, causing the remaining atoms to become ions.

These cells are more generally referred to within the public domain as batteries and are more predominantly used as a means of storing electrical energy.

However, some applications of these cells, like certain timing systems, temperature indicators and visual indicators, capitalize on other attributes inherent to these cells. One particular attribute of interest is the transformation of molecules within the anode from atom to ion and the subsequent change in optical properties. The optical properties of the anode change from opaque to transparent as atoms become ions.

The change in optical properties is relied upon within certain timing systems, temperature indicators and visual indicators. Within these applications anode material consists of a thin metal film which has been deposited by evaporation or sputter or similar technique and configured on the same plane or nearly the same plane as a cathode such that when an electrolyte is introduced, anode atoms begin to deplete themselves of electrons and transform into ions, beginning at a point closest to the cathode. As depletion continues an ion rich transparent region begins to expand in a direction away from the cathode.

As the optical properties of the anode change from opaque to transparent backgrounds that used to lay hidden become visible. The expansion of the transparent region reveals various colors, text and/or patterns which have been printed just behind the anode.

SUMMARY OF THE INVENTION

An electronically readable device and system is incorporated within and/or attached to an object to validate and/or authenticate the object. Upon activation of the device one or more codes encoded within the device are revealed and are able to be scanned by an electronic device. The electronically readable code changes, such that for each period of time the code is different than a previous period and only the database knows in advance what the code should be for a given period. The scanned code is uploaded to the database where it is compared to a stored code to verify that the object is authentic.

In one aspect, an electronically readable device comprises an anode layer, a cathode layer, an electrolyte configured to contact the anode layer and the cathode layer, and a base comprising one or more electronically readable codes, wherein after activation of the device, the anode layer depletes to uncover the one or more electronically readable codes such that for a subsequent period of time the electronically readable code is different than an electronically readable code of a previous period of time.

In another aspect, a system for validating an object comprises a database comprising one or more stored codes and an electronically readable device comprising one or more electronically readable codes which are revealed after activation of the device, wherein the one or more electronically readable codes are read and compared to the one or more stored codes to validate the object. In some embodiments, the one or more electronically readable codes are revealed such that for a subsequent period of time the electronically readable code is different than an electronically readable code of a previous period of time.

In a further aspect, a method of validating an object comprises coupling an electronically readable device comprising one or more electronically readable codes which are revealed after activation of the device with the object, scanning an electronic code at a first time period, uploading the electronic code to a database and comparing the first time period scanned code to a first time period stored code to validate the object. In some embodiments, the method comprises scanning an electronic code at a second time period and comparing the second time period scanned code to a second time period stored code to validate the object.

DETAILED DESCRIPTION OF THE INVENTION

The description below concerns several embodiments of the presently claimed invention. The discussion references the illustrated preferred embodiment. However, the scope of the presently claimed invention is not limited to either the illustrated embodiment, nor is it limited to those discussed, to the contrary, the scope should be interpreted as broadly as possible based on the language of the Claims section of this document.

This disclosure provides several embodiments of the presently claimed invention. It is contemplated that any features from any embodiment can be combined with any features from any other embodiment. In this fashion, hybrid configurations of the illustrated embodiments are well within the scope of the presently claimed invention.

Figure 1:
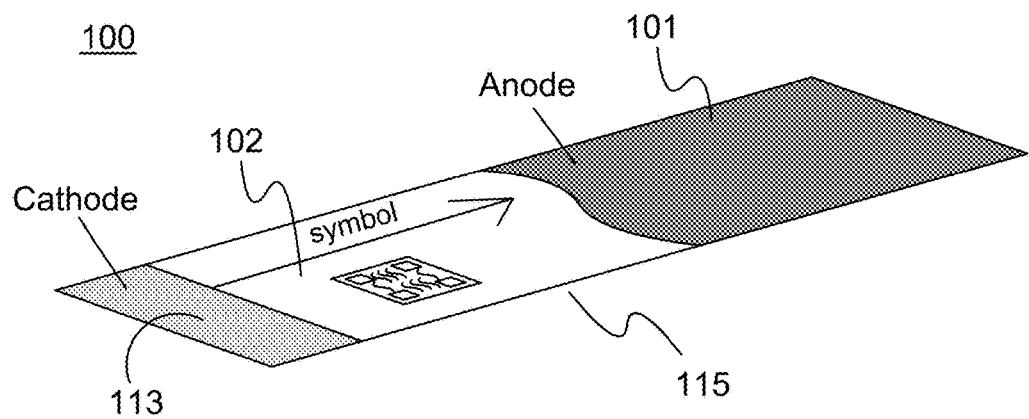
FIG. 1 illustrates an electronically readable device in accordance with some embodiments.

Referring now to FIG. 1, an electronically readable device is depicted therein. The device 100 comprises an anode 101 and a cathode 113 which have been deposited on a substrate 115, and a quantity of electrolyte (not shown). In some embodiments, the anode 101 and the cathode 113 are thin-film deposited onto the substrate 115. However, the anode 101 and the cathode 113 are able to be attached to the substrate 115 by any appropriate method as known in the art. Upon activation of the electronic device 100, the anode 101 is depleted longitudinally away from and perpendicular to the cathode 113, as demonstrated by the arrow. Depletion of the anode 101 occurs at a point nearest to the cathode 113 first and progresses longitudinally away from and perpendicular to the cathode 113. Depletion of the anode 101 occurs at an initial rate which lessens as the anode 101 depletes away from the cathode 113. In some embodiments, the timing device comprises one or more electronically readable codes 102 printed or deposited onto the substrate 115 that are uncovered as the depletion of the anode 101 progresses. In some embodiments, as the anode 101 is depleted, a top layer becomes transparent. In some embodiments, the In some embodiment, the anode 101 comprises aluminum (Al) and the cathode 113 comprises copper (Cu).

The electronic device 100 comprises a means to activate the device. In some embodiments, the electronic device 100 comprises a protective reservoir which contains a small amount of electrolyte (not shown) molded to the cathode layer and protruding outward. The electronically readable device 100 is activated when a consumer applies pressure to the protrusion thereby braking the barrier and depositing the small quantity of electrolyte into contact with the main body of the timing device and activating the timing device.

After activation of the device 100 and as the device 100 expires, the one or more electronically readable codes 102 are uncovered and are able to be read by an electronic device such as a smart phone or tablet device. In some embodiments, the electronically readable device 100 comprises a plurality of electronically readable codes 102 and as the anode layer 101 depletes the one or more electronically readable codes 102 are uncovered such that for a subsequent period of time the electronically readable code is different than an electronically readable code of a previous period of time. Alternatively, or in conjunction, in some embodiments, as the anode layer 101 depletes a new portion of the electronically readable code 102 is uncovered such that for each period of time the code 102 is different than the previous period. In some embodiments, the electronically readable code 102 comprises a QR code or a bar code. Alternatively, in some embodiments, the electronically readable code 102 comprises one or more RFID codes. Particularly, the anode layer 101 is able to shield such that the RFID code only becomes readable once the shield and/or the anode layer 101 is depleted. In this manner, the readable code 102 is able to be optically read and/or embedded within the device 100 and read via radio frequency (RF). However, the electronically readable code 102 is able to comprise any electronically readable code as appropriately desired.

In some embodiments, as the device 100 expires a visual change is seen. For example, in some embodiments a color change or change in transparency is seen as the anode layer of the timing device is depleted. As time progresses, the anode material of the timing device is depleted and more electronically readable information is uncovered.

Generally, the rate of reaction of an electro-chemical reaction within a timing device increases with an increase in temperature. Particularly, timing devices that utilize liquid electrolytes experience an increase in conductivity of the electrolyte with an increase in temperature. This is due to the overall mobility of the molecules within the liquid electrolyte. Consequently, when designing a timing device that utilizes a depleting anode layer to indicate a passage of time, the effect of the changing conductivity of the electrolyte must be considered. Without some way to correct for the change in temperature, the timing device is only accurate within a controlled temperature environment. However, by compensating for the change in temperature a timing device is able to be used for applications in a non-controlled temperature environment.

The electrochemical timing devices rely upon an electron flow through a path that is external to the timing cell. Consequently, influencing the flow of the electrons also influences the depletion rate of the anode material because the depletion occurs when the atoms in the anode material gives up electrons. These electrons flow through the return path.

Connecting a temperature dependent resistor (TDR) in series with the electron return path affects the rate of flow of the electrons. If the TDR has a negative temperature coefficient then its conductivity decreases with an increase in temperature. This is opposite to what occurs within the electrolyte. Consequently, if the TDR's rate of change in the negative direction is equal to the electrolyte's rate of change in the positive direction, then the timing device is temperature corrected or temperature independent for each instantaneous moment in time. In this manner, the timing device is able to be corrected for an ambient temperature change. However, a change of the internal resistance of the electrolyte across a broad spectrum of time must be considered in order to ensure that the entire timing device is accurate independent of temperature.

As time progresses the anode material depletes in a direction further away from the cathode. As the anode depletes, the electrolyte migrates along with the depletion of the anode, increasing the distance between the cathode and the anode. As the distance between the cathode and the anode increases so does the internal resistance of the electrolyte. Since the rate of electron flow or current (I) is dependent upon factors which include total resistance ($R_T$) (the sum of the internal resistance ($R_I$) and the external resistance ($R_X$)), the electron flow must be decreasing at a constant rate as the anode depletes. This poses a problem when using a TDR by itself to affect the electron flow or current and correct for temperature. TDR's are an effective means of correcting for ambient temperature when current fluctuations due to changing temperature are the only variable. In order for TDRs to work across a broad spectrum of time, the changes in current, due to an increase in $R_I$ must be made constant, thus eliminating it as a variable.

Figure 2:
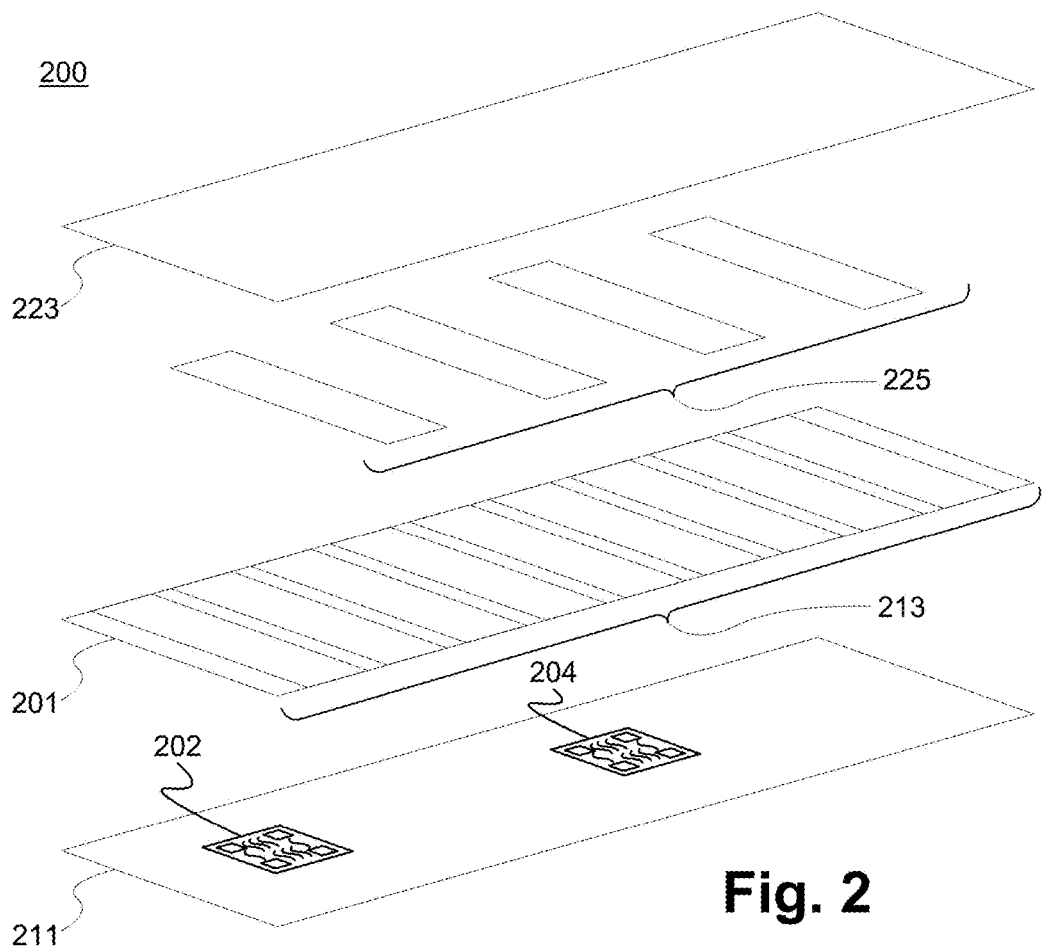
FIG. 2 illustrates an electronically readable device in accordance with some embodiments.

One solution is to design a timing device so that an anode only has to deplete a very short distance before a new cathode structure is revealed and limit the range of distance-related-current changes that need to be considered. FIG. 2 shows an exploded view of a electronically readable device with a plurality of cathode trace structures introduced in a close proximity throughout the device. As shown in FIG. 2, the electronically readable device 200 comprises a base 221, an anode layer 201, an electrolyte (not shown), a plurality of cathode trace structures 213, a plurality of masks 225 and a cover 223. In some embodiments, when the electronically readable device 200 is activated the anode layer 201 is depleted at a point nearest the first cathode trace structure at the beginning of the timing device 200 and progresses in a direction longitudinally away from and perpendicular to the first cathode trace structure to the second cathode trace structure. In this manner, the anode layer is depleted along the length of the timing device. As the number of cell divisions and cathode trace structures increases, so does the resolution and the accuracy of the timing device.

After activation of the device 200 and as the device 200 expires, the one or more electronically readable codes 202 are uncovered and are able to be read by an electronic device such as a smart phone or tablet device. In some embodiments, the electronically readable device 200 comprises a plurality of electronically readable codes 202 and 204. As the anode layer 201 depletes the one or more electronically readable codes 202 and 204 are uncovered such that the electronically readable code 202 is first uncovered and then the electronically readable code 204 is uncovered and can be read at a later time. Alternatively, or in conjunction, in some embodiments, as the anode layer 201 depletes a new portion of the electronically readable code 202 is uncovered such that for each period of time the code 202 is different than the previous period. In some embodiments, the electronically readable codes 202 and 204 comprise a QR code or a bar code. However, the electronically readable codes 202 and 204 are able to comprise any electronically readable code as appropriately desired.

Alternatively, in some embodiments, the electronically readable codes 202 and 204 comprise RFID codes. Particularly, the anode layer 201 is able to shield such that the RFID code only becomes readable once the shield and/or the anode layer 201 is depleted. In this manner, the readable codes 202 and 204 are able to be optically read and/or embedded within the device 200 and read via radio frequency (RF).

As shown within FIGS. 1 and 2, after activation of the device 100 and the device 200, anode material of the timing device is depleted and electronically readable information is uncovered. Alternatively, the device 100 and the device 200 are able to comprise any appropriately desired electronic circuits which allow the timing device to be depleted and the electronically readable information is uncovered.

Figure 3:
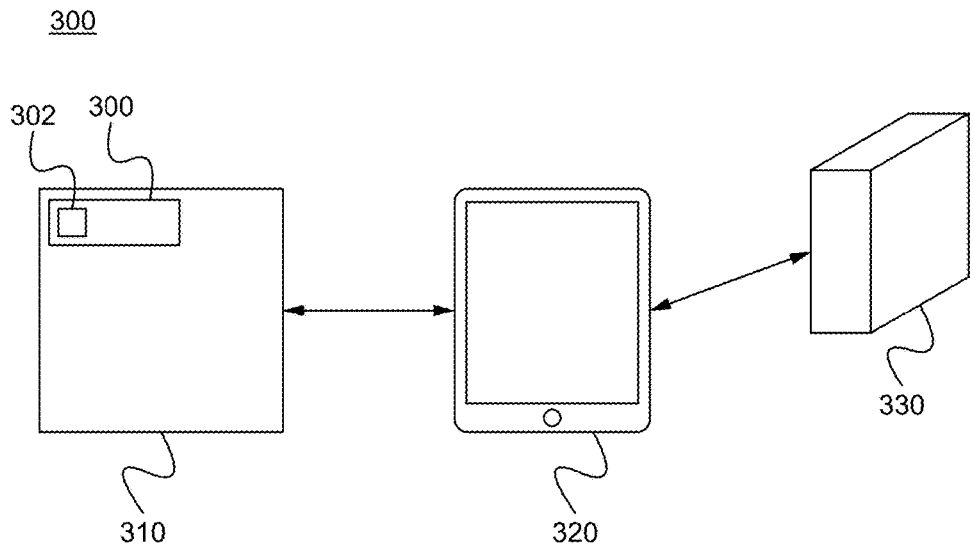
FIG. 3 illustrates a system for validating an object in accordance with some embodiments.

In some embodiments, after the electronically readable codes are read by an electronic device the codes are able to be uploaded to a database comprising one or more stored codes. The one or more scanned or read codes are able to be compared to the one or more stored codes. The scanned or read codes are compared to the one or more stored codes to validate the scanned codes. In some embodiments, an electronically readable device such as described above is used to validate an object. FIG. 3 illustrates a system for validating an object in accordance with some embodiments.

As shown in FIG. 3, the system 300 comprises a database 330 comprising one or more stored codes and an electronically readable device 304 comprising one or more electronically readable codes 302. As described above, after activation of the device 304 and as the device 304 expires, the one or more electronically readable codes 302 are uncovered and are able to be read by an electronic device 320. In some embodiments, the electronically readable device 304 comprises a plurality of electronically readable codes 302 such that for a subsequent period of time the electronically readable code is different than an electronically readable code of a previous period of time. Alternatively, or in conjunction, a new portion of the electronically readable code 302 is uncovered such that for each period of time the code 302 is different than the previous period.

As shown within FIG. 3, in some embodiments, the electronically readable device 304 is able to coupled to an object 310. The electronically readable device 304 is able to be used to verify the authenticity of the object 310. Particularly, the scanned or read code 302 is able to be compared to the one or more stored codes to verify that the object is authentic and not counterfeit. As described above, the code 302 changes, such that for each period of time the code 302 is different than a previous period and only the database 330 knows in advance what the code 302 should be for a given period. The code 302 must match the stored code for the given period to verify that the object is authentic. The changing status of the code 302 is able to be used to verify authenticity because it is unknown what the code will be in the future.

In some embodiments, the database 330 is able to maintain information about the object 310 such as its date of manufacture, existing unique product identification, in addition to storing the codes for the given time periods. The system is able to be used to authenticate any appropriately desired object.

Figure 4:
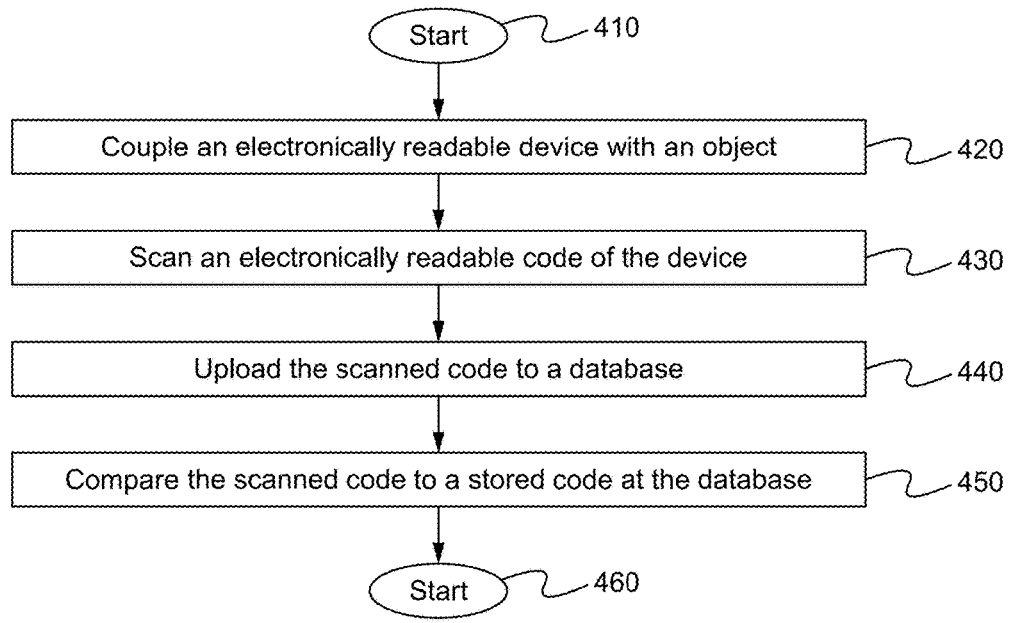
FIG. 4 illustrates a method of validating an object in accordance with some embodiments.

FIG. 4 illustrates a method of validating an object in accordance with some embodiments. The method begins in the step 410. In the step 420, a device comprising one or more electronically readable codes is coupled to an object, and in the step 430, the device is scanned. In some embodiments, the device is scanned and/or read by an electronic device such as a smart phone or tablet device. In the step 440, the scanned code is uploaded to a database and in the step 450 the scanned code is compared to a stored code at the database. In some embodiments, the scanned code is compared to the stored code to verify that the object is authentic and not counterfeit. In some embodiments, the code is configured to change, such that for each period of time the code is different than a previous period and only the database knows in advance what the code should be for a given period.

After activation, the device begins to expire and or more electronically readable codes are uncovered and are able to be read by the electronic device. In some embodiments, the electronically readable device comprises a plurality of electronically readable codes such that for a subsequent period of time the electronically readable code is different than an electronically readable code of a previous period of time. Alternatively, or in conjunction, a new portion of the electronically readable code is uncovered such that for each period of time the code is different than the previous period. The electronically readable code changes, such that for each period of time the code is different than a previous period and only the database knows in advance what the code should be for a given period.

When the scanned code is compared to a stored code, the scanned code must match the stored code for the given period to verify that the object is authentic. The changing status of the electronically readable code is able to be used to verify the authenticity of the object. Particularly, as the electronically readable code changes, only the database knows in advance what the code should be for a given period and the scanned code must match the stored code for the given period to verify that the object is authentic. The method ends in the step 460.

In use, an electronically readable device and system is able to be incorporated within and/or attached to an object to validate and/or authenticate the object. Upon activation of the device one or more codes encoded within the device are revealed and are able to be scanned by an electronic device. The electronically readable code changes, such that for each period of time the code is different than a previous period and only the database knows in advance what the code should be for a given period. The scanned code is uploaded to a database where it is compared to a stored code to verify that the object is authentic. Particularly, because the electronically readable code is constantly changing, it is harder to copy. Consequently, when the readable code is compared to and matches a stored code it is certain that the product is authentic and is not counterfeit. Consequently, the electronically readable device and system as described herein has many advantages.

The present invention has been described in terms of specific embodiments incorporating details to facilitate the understanding of the principles of construction and operation of the invention. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

I claim:

1. An electronically readable device comprising:
   a. an anode layer;
   b. a cathode layer;
   c. an electrolyte configured to contact the anode layer and the cathode layer; and
   d. a base comprising one or more electronically readable codes,
   wherein after activation of the device, the anode layer depletes to uncover the one or more electronically readable codes such that for a subsequent period of time the electronically readable code is different than an electronically readable code of a previous period of time.

2. A system for validating an object comprising:
   a. a database comprising one or more stored codes; and
   b. an electronically readable device comprising one or more electronically readable codes which are revealed after activation of the device,
   wherein the one or more electronically readable codes are read and compared to the one or more stored codes to validate the object, wherein the one or more electronically readable codes are revealed such that for a subsequent period of time the electronically readable code is different than an electronically readable code of a previous period of time.

3. The system of claim 2 wherein once revealed, the one or more electronically readable codes are able to be read by a human or machine.

4. The system of claim 2 wherein once revealed, the one or more electronically readable codes are able to be scanned by an electronic device.

5. A method of validating an object, the method comprising:
   a. coupling an electronically readable device comprising one or more electronically readable codes which are revealed after activation of the device with the object;
   b. scanning an electronic code at a first time period;
   c. uploading the electronic code to a database;
   d. comparing the first time period scanned code to a first time period stored code to validate the object; and
   e. scanning an electronic code at a second time period and comparing the second time period scanned code to a second time period stored code to validate the object.

6. The method of claim 5 wherein once revealed, the one or more electronically readable codes are able to be read by a human or machine.

7. The method of claim 5 wherein once revealed, the one or more electronically readable codes are able to be scanned by an electronic device.

8. An electronically readable device comprising:
   a. one or more shields; and
   b. a base comprising one or more electronically readable codes, wherein the electronically readable codes are prevented from being read by the one or more shields,
   wherein after activation of the device, the one or more electronically readable codes become readable through the one or more shields such that for a subsequent period of time the electronically readable code is different than an electronically readable code of a previous period of time.

* * * * *